United States Patent
Chadzelek

(10) Patent No.: US 9,742,835 B2
(45) Date of Patent: *Aug. 22, 2017

(54) SYSTEM AND METHOD FOR BACKEND CONTROL OF FRONTEND USER INTERFACES

(71) Applicant: SAP SE, Walldorf (DE)

(72) Inventor: Thomas Chadzelek, St. Ingbert (DE)

(73) Assignee: SAP SE, Walldorf (DE)

( * ) Notice: Subject to any disclaimer, the term of this patent is extended or adjusted under 35 U.S.C. 154(b) by 181 days.

This patent is subject to a terminal disclaimer.

(21) Appl. No.: 14/690,094

(22) Filed: Apr. 17, 2015

(65) Prior Publication Data
US 2016/0308974 A1    Oct. 20, 2016

(51) Int. Cl.
*H04L 29/08* (2006.01)
*G06F 9/44* (2006.01)

(52) U.S. Cl.
CPC .......... *H04L 67/025* (2013.01); *G06F 9/4443* (2013.01); *H04L 67/02* (2013.01)

(58) Field of Classification Search
CPC .................................................. H04L 67/141
USPC .......................................................... 709/228
See application file for complete search history.

(56) References Cited

U.S. PATENT DOCUMENTS

2012/0246202 A1* 9/2012 Surtani ............. G06F 17/30607
   707/812
2013/0304799 A1* 11/2013 Lutter ............... G06F 17/30477
   709/203

* cited by examiner

*Primary Examiner* — David Lazaro
*Assistant Examiner* — Zia Khurshid
(74) *Attorney, Agent, or Firm* — Jones Day

(57) ABSTRACT

A system and method for transmitting data using a data transfer protocol, including receiving, at the first device, a request object from the second device, receiving, at the first device, a response object in response to the request object, transforming the response object by appending a one or more logical expressions for controlling at least one user-interface component of an application hosted at the second device, varying the format of the response object to generate a transformed response object, and sending the transformed response object to the second device.

15 Claims, 4 Drawing Sheets

200

300

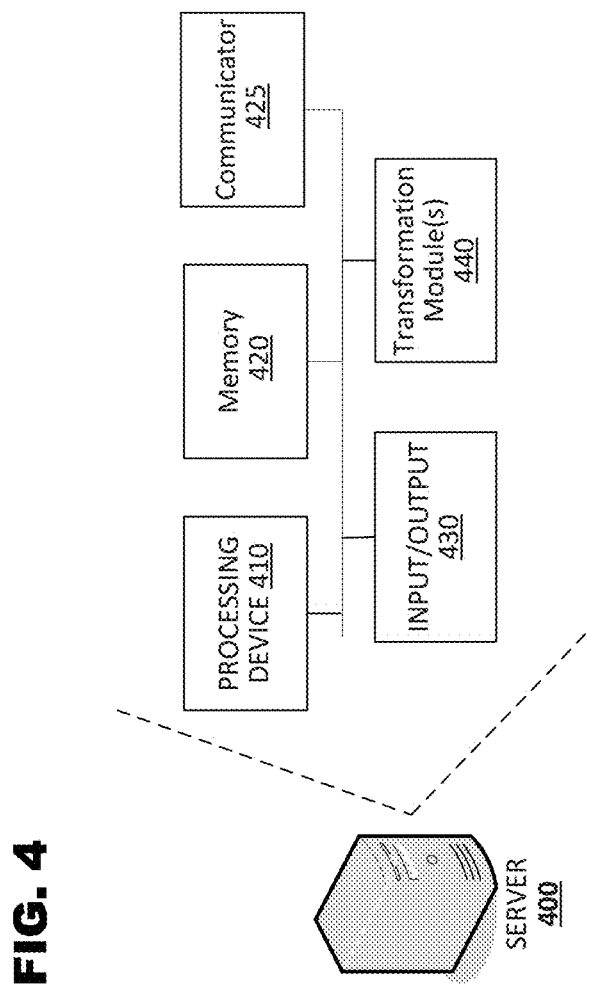

SYSTEM AND METHOD FOR BACKEND CONTROL OF FRONTEND USER INTERFACES

FIELD OF INVENTION

The present disclosure generally relates to control of user-interface components, and more particularly, to efficient control of user-interface components by one or more backend servers.

BACKGROUND

In modern Internet applications, business processes and logic continue to be executed at backend servers. To a limited extent, other processes, such as input validation, value help, field control (e.g., whether a field is editable, mandatory, hidden), and data manipulation (e.g., sorting, filtering, etc.) may be partly executed by a client device in conjunction with a backend server. As a result, numerous interactions are often required between the client device and the backend server. Such interactions often cause significant performance issues, especially within mobile networks where bitrates and available bandwidth may be limited.

Within a client-side application, control of user-interface components typically requires many interactions between the client device and the backend server. For example, field control in SAP's Fiori applications is either static or implemented using a special field inside an OData service. Such implementations require numerous backend interactions to update the special field. Accordingly, control of the frontend user-interface from the backend server's business logic requires substantial network resources. In another example, other known applications require duplication of backend logic at the frontend client device. In this type of application, developer efficiency is significantly impaired as frontends are short-lived and change frequently. By contrast, applications hosted on backend servers typically have a much longer lifecycle. In yet another example, some applications may not use field control on the client device, which results in a poor user-experience.

In light of the problems identified above, the inventor has provided systems and methods for efficiently controlling user-interface components from one or more backend server(s). The embodiments described below provide control of user-interface components without excessive client-server interactions. In addition, the various embodiments described herein enable efficient application development and good user-experience.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 4 illustrates a representative architecture of a user-interface server according to an example embodiment.

DETAILED DESCRIPTION

Figure 1:
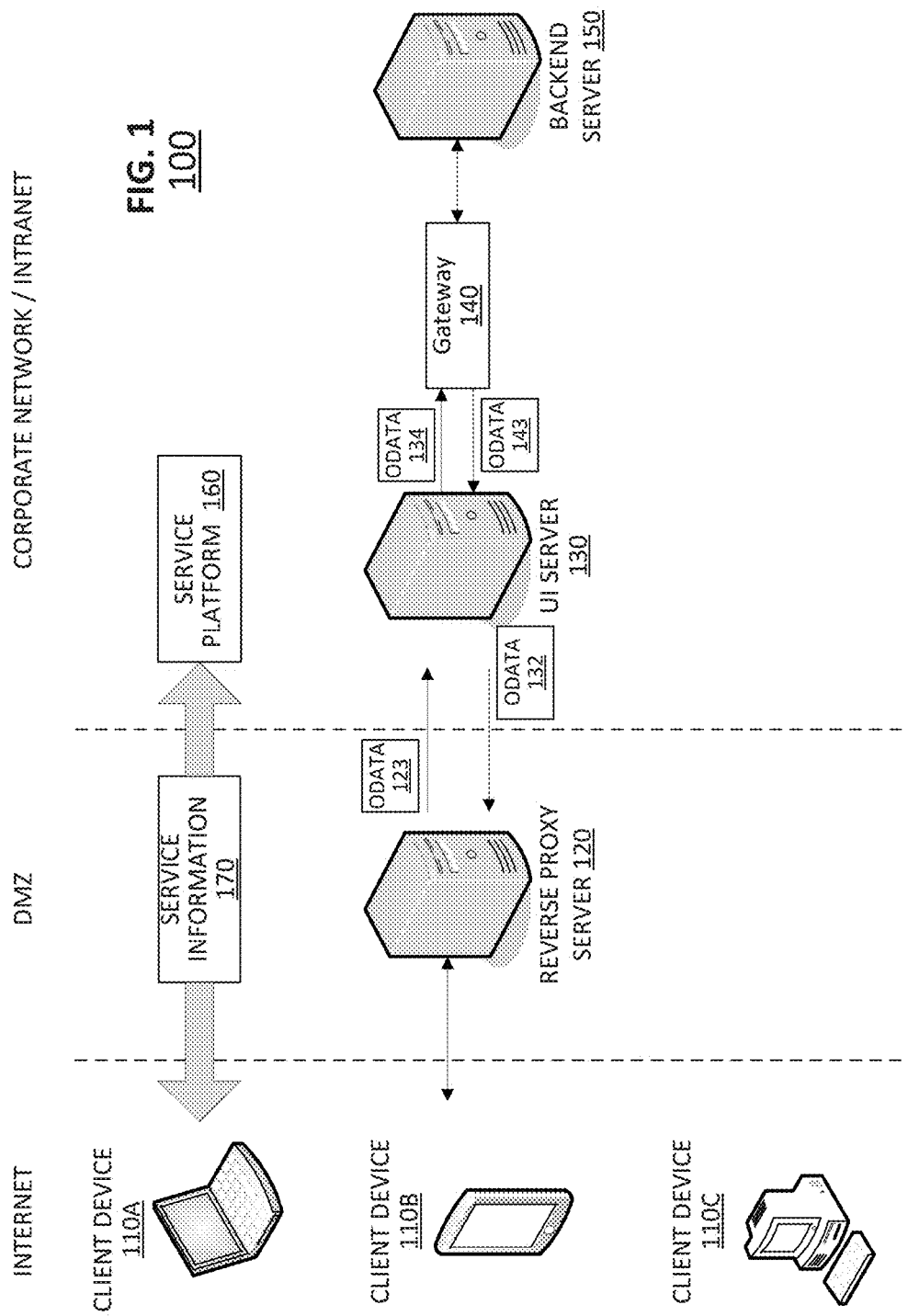
FIG. 1 is a system diagram depicting an architectural overview of a networked system for facilitating web service communications using a data transfer protocol according to an example embodiment.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Prior to discussing specific example embodiments, further descriptions of some terms are now provided for a better understanding of the descriptions set forth herein.

"OData," as used herein, may refer to the Open Data Protocol, an open web protocol for querying and communicating data using Representational State Transfer (REST) web services. OData enables the creation and use of Hyper-Text Transfer Protocol (HTTP)-based data services, which allow resources identified using Uniform Resource Identifiers (URIs) and defined in an abstract data model, to be published and edited by Web clients using simple HTTP messages. OData typically uses commonly deployed web technologies such as Transmission Control Protocol (TCP), HTTP, Atom Publishing Protocol, XML, and JavaScript Object Notation (JSON) to exchange data between systems. The results of OData queries (payloads) are typically structured in readily parseable formats, such as Atom, JSON, or XML, and may be parsed by any number of client libraries provided by platforms such as .NET, Silverlight, Java, AJAX, PHP, and mobile development platforms. OData, as used herein, may refer to any standardized or non-standardized version of the OData protocol, or like web protocols (e.g., Google Data Protocol (GData)) communicating using REST-based web service communication techniques.

"OData Channel," as used herein, may refer to a channel of communications using OData, provided to connect with a specific backend data services to obtain enterprise data. Examples of an enterprise data service include Customer Relationship Management (CRM) services, ERP (Enterprise Resource Planning) systems, MIS (Management Information Service) systems, Content Management (CM) services, Human Resource Management (HRM) services, payment services, accounting or invoicing services, business intelligence services, document management services, or other information system services configured to maintain, provide, or facilitate enterprise or business-related data. Such enterprise data services may be operated in an on-demand manner in a Software-as-a-Service (SaaS) or cloud-based environment, or in a standalone-installation accessible by one or more clients. Examples of enterprise data include, for example and not for limitation, business objects, business documents, notes, bookmarks, annotations, terminology, or any other business data or concepts. In some examples, the enterprise data may be extracted or compiled from heterogeneous sources (e.g., an email database server and a purchase order database). Further, the enterprise data may be structured (e.g., type defined via a schema, such extensible markup language (XML)) or unstructured (e.g., document processing software documents) according to open or proprietary standards.

Use of the OData protocol with a solution allows the REST-based exchange of specific types of data and metadata. The OData protocol provides a consuming client with a data access structure that is easier to consume than structured web services such as SOAP-based web services. Specifically, the OData protocol provides for use of a metadata document and/or service document that describes resources, identified by URIs and defined in a data model, to be accessed with create, retrieve, update, and delete operations using simple HTTP messages.

The OData protocol also allows a consuming client to obtain other service URIs, and obtain full XML-based information of the available service model, by access to a single URI of the Service Document. Further, the OData protocol allows a data model to be easily exposed through use of a metadata document that describes the structure and organization of resources exposed as HTTP endpoints. A wide variety of client applications, whether complex or simple, may parse the service document and the metadata document to obtain parameters of the data service, and perform simple HTTP web service communications to communicate with such data service.

According to the various embodiments, a user interface solution may be configured to intercept OData requests between an OData client (e.g., a mobile device, personal computer, or other target system) and a backend system (e.g., a server, ERP, CRM, or other enterprise data source). The user-interface solution may apply various data transformation or manipulation techniques to the data. Some of the example embodiments described herein provide methods and systems for backend field control for OpenUI5 via OData dynamic expressions and UI5 expression binding for SAP's Fiori applications, but the embodiments are not so limited. The embodiments may be applied to variety of data communication standards, applications, and frontend technologies.

In an example embodiment, a user-interface server is configured to intercept, capture, or otherwise receive OData requests originating from an OData client being transmitted to an OData service. The user-interface server provides OData access for the OData service hosted by one or more backend systems (e.g., the enterprise data services such as an ERP or CRM system) for the consuming frontend systems/applications (e.g., mobile devices, personal computers, and other consuming clients of the enterprise data services). From the perspective of the consuming clients, the data is sent directly to the backend, and the user-interface server may not be visible as a separate entity. Thus, the user-interface server as a middle party to implement and facilitate an appropriate level of data transformation. Within the user-interface server, a rules engine, such as a transformation engine, can be used for defining and implementing rules that affect the results and the parameters of data transformation operations.

FIG. 1 is a system diagram depicting an architectural overview of a networked system 100 for facilitating web service communications using an OData protocol according to an example embodiment. The system 100 may include client devices 110A, 110B, 110C (collectively 110), reverse proxy server 120, user-interface server 130, gateway 140 and one or more backend server(s) 150. In addition, the system 100 may be configured to use a variety of communication protocols, such as the ODATA protocol. For example, the OData protocol may use a series of RESTful web service communications, such as HTTP methods (e.g., get, post, put, delete, etc.), to query and interact with data from a data service, such as backend server 150.

As illustrated by FIG. 1, the system 100 includes one or more client devices 110 being network accessible via an Internet connection, and connected to a reverse proxy server 120 in a network demilitarized zone (DMZ). Client devices 110 may include a variety of example devices such as a mobile device (e.g., mobile phone or a smartphone), a personal computer, a laptop, a tablet, or the like. Each of such client devices 110 may utilize various user-interface technologies (e.g., OpenUI5, Java, JavaScript, and the like). In addition, each of the client devices 110 may be configured to transmit and receive OData communications with the reverse proxy server 120. The OData communications may include one or more OData requests (e.g., OData request 123) and the responses to such OData requests (e.g., OData response 132).

The reverse proxy server 120 is configured to transmit the OData request 123 to an enterprise data system such as a backend server 150 in a corporate intranet/backend network. The gateway 140 may translate requests, such as OData request 123, to other proprietary protocols, such as remote function call (RFC). The backend server 150 may be configured to process the translated request, retrieve data, and/or perform data operations as an appropriate response to a request. Upon completion, the backend server 150 may return a response for transmission back to the gateway 140. As needed, the gateway 140 may translate a response using a proprietary protocol back to the OData protocol. The OData response will then be transmitted from the gateway 140 (which is located in the intranet/backend network), to the reverse proxy server 120, to the appropriate client device 110. Such a path of the OData communications between the client device 110 and the backend server 150 may be considered as an OData Channel.

The user-interface server 130 may be located between the reverse proxy server 120 and the gateway 140 to intercept OData communications such as the OData request 123. The user-interface server 130 may operate as a middle party with both client and server functionality to handle communications in both directions. The user-interface server 130 performs functions of an OData server to receive and handle OData requests from client devices 110. The user-interface server 130 also performs functions of an OData client, to forward incoming OData requests from the client device 110 to the gateway 140 and the backend server 150. The user-interface server 130 may perform this by forwarding an OData request 134 to the backend server 150, and receiving a corresponding OData response 143. Alternatively, the functionalities of the user-interface server 130 may be integrated into the backend server 150.

After receiving the OData response 143 from the gateway server 140 (and correspondingly, from the backend server 150), the user-interface server 130 may append user-interface control information to the OData response 143. For example, the appended user-interface control information may be used to determine the state of one or more user-interface components of a client-side application (e.g., hidden, read-only, editable, mandatory, and the like).

In addition, the user-interface control information may be appended as a logical expression or formula such that it may be executed directly at the client device 110. Here, backend server 150 and user-interface server 130 may communicate and store data values (e.g., last name plus comma plus first name) in an OData compliant manner. However, the user-interface server 130 also may transform stored data values and user-interface control information into client-executable expressions (e.g., OpenUI5 expression bindings). The user-interface server 130 may include a reusable code to implement such transformations. In some instances, client-executable expressions may include functions such as "odata.concat" in order to implement this transformation. Alternatively, such transformations may be implemented at client device 110.

User-interface control information may be transmitted to the client device 110 for execution using a variety of interface technologies (e.g., OpenUI5, Java, JavaScript, and the like). By including user-interface control information in a client-executable manner, interactions between the client device 110 and the backend server 150 may be reduced and network resources preserved. In some instances, the client device 110 may optionally specify that user-interface control information be appended as a logical expression or formula.

Once user control information is appended by the user-interface server 130, the transformed response 132 may be returned to the client device 110 via the user-interface server 130. As shown, transformed OData response 132 which contains user-interface control logic and/or formulas is communicated from the user-interface server 130 to the reverse proxy server 120, for communication to the appropriate client device 110.

Accordingly, user-interface control information that is generated at the backend can be supplied to various client devices 110 to implement user interfaces of a client-side application. Backend logic can be transformed once into an appropriate user-interface technology and reused across different client devices 110. In some instances, the user interface may be generated by the client device 110 at runtime ("on the fly"). Alternatively, the user interface may be generated at design-time, in a suitable developer studio or integrated development environment (IDE). Irrespective of when the user interface is generated, the client device 110 utilizes the meta description provided by OData (i.e., metadata, annotations, and the formulas contained therein).

The various client devices 110 may process and consume other information used with the recognition and access of the OData connection and the OData channel. For example, a service platform 160 may be used to publish service information 170 related to the OData channel (e.g., the OData service document and metadata document) to various consuming client devices 110. The service platform 160 may provide functionalities to publish and locate such OData service documents, to enable proper establishment of device connections, authentication, and onboarding. For example, the location of the user-interface server 130 may be indicated by the service information 170. To the requesting client device 110, the interception of the OData request 123 by the user-interface server 130 may be fully transparent. In other configurations, a gateway or other component may be used to redirect the OData request 123 to the user-interface server 130. Other information related to the OData channel and related services may be communicated to the consuming clients directly or indirectly from components located accessible in the DMZ, the corporate intranet, or the Internet.

Thus, the client application is able to consume the OData services provided by the backend server 150 and an appropriate level of transformation may be provided without changing the backend server 150 or the client application. The user-interface server 130 may include or integrate with any number of components for performing various degrees of data transformation and manipulation.

Figure 2:
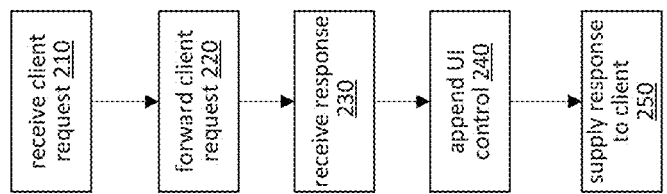
FIG. 2 illustrates a method for processing a request from a client device according to an example embodiment.

FIG. 2 illustrates a method 200 for processing a request from a client device according to an example embodiment.

Initially, at step 210, the user-interface server 130 receives a client request intended for the backend server 150. The client request may be intercepted, redirected, or otherwise provided to the user-interface server 130 to facilitate transformation of data in the eventual response to the client request. When the client device 110 transmits a client request, the user-interface server 130 may be transparent such that the client device 110 may still direct its request directly to the backend server 150. Alternatively, in some embodiments, the functionalities of the user-interface server 130 may be fully integrated within the backend server 150.

Next, at step 220, the user-interface server 130 transmits the client request to its intended recipient, the backend server 150. In advance of transmitting the client request to the backend server 150, the user-interface server 130 may determine the type of client request being received. Example requests include "get" and "modify." The client request may be transmitted using a REST-based protocol such as OData, and may include standard HTTP create, read, update, and delete commands (i.e., post/get/put/delete) to perform data operations according to the data transmission protocol or data format involved in the request.

For example, if the request is a "get" type request, the user-interface server 130 retrieves one or more documents from the backend server 150, at step 230. In another example, when the request is a "modifying" type request (e.g., post, put, etc.), the request typically contains (or references) one or more input documents. Before satisfying the request(s) of the client device 110, the user-interface server 130 may append user-interface control information to the client response, at 240. As discussed above, the appended user-interface control information may be used to determine the state of one or more user-interface components of a client-side application (e.g., hidden, read-only, editable, mandatory, and the like). In addition, the user-interface control information may be appended as a logical expression or formula such that it may be executed directly at the client device 110. In particular, the user-interface server 130 may transform stored data values and user-interface control information into client-executable expressions (e.g., OpenUI5 expression bindings).

Lastly, the transformed client response is supplied to the requesting client device 110 at 250. Thus, after retrieving an OData response from the backend server 150, the user-interface server 130 may perform the data transformation on the received data. Although not shown, if any error occurs while processing a client request, an error response may be returned to the client instead of the requested information.

Figure 3:
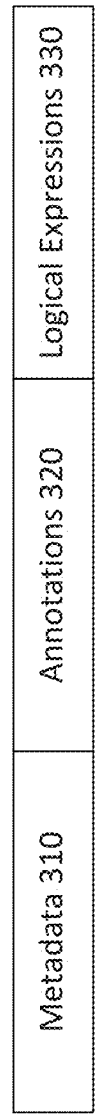
FIG. 3 is a block diagram showing a data structure according to an example embodiment.

FIG. 3 is a block diagram showing a data structure 300 according to an example embodiment. As shown in FIG. 3, the data structure includes metadata 310, annotations 320, and logical expressions 330.

FIG. 4 illustrates a representative architecture of a transformation server 400 according to an example embodiment.

Transformation server 400 may include processing device 410, memory 420, and input/output module(s) 430. Transformation system 400 may also include one or more transformation module(s) 440 and/or other modules or components that generally implement the functionality of the user-interface server. The components and functions of the transformation module(s) 440 are explained in detail with reference to FIGS. 1 and 2. Processing device 410 may execute instructions of transformation and other modules stored in memory 420.

Memory 420 may include a computer readable medium storing transformation modules, which may include instructions associated with modules of the transformation system 400. In an embodiment, memory 420 may contain different components for retrieving, presenting, changing, and saving data and may include computer readable media. Memory 420 may include a variety of memory devices, for example, Dynamic Random Access Memory (DRAM), Static RAM (SRAM), flash memory, cache memory, and other memory devices. Additionally, for example, memory 420 and processing device(s) 410 may be distributed across several different computers that collectively comprise a system. Memory 420 may be capable of storing client and backend inputs. In some instances, a cache in memory 420 may store client requests as well as original and transformed client responses, as needed.

Components of transformation system 400, such as processing device 410, memory 420, and a communications device 425, may be interconnected via a system bus. In various embodiments, the device 400 may have an architecture with modular hardware and/or software systems that include additional and/or different systems communicating through one or more networks via communications device 425.

Communications device 425 may enable connectivity between the processing devices 410 in the device 400 and other systems by encoding data to be sent from the processing device 410 to another system over a network and decoding data received from another system over the network for the processing device 410.

Processing device 410 may perform computation and control functions of a system and comprises a suitable central processing unit (CPU). Processing device 410 may include a single integrated circuit, such as a microprocessing device, or may include any suitable number of integrated circuit devices and/or circuit boards working in cooperation to accomplish the functions of a processing device. Processing device 410 may execute computer programs, such as object-oriented computer programs, within memory 420.

Although example transformation services are depicted as a single entity, it is to be appreciated that the or any similar transformation service may include fewer or more modules and components, and integrated into a single system or from the operation of independent systems and subsystems. For example, the transformation engine may operate as a stand-alone service which provides data to the transformation server regarding applicable policies and rules. Further, additional and different modules and other types of integration with the backend service or the requesting client device may be provided for the transformation server.

Each of the client devices, the reverse proxy, the user-interface server, the gateway, the backend server, and other processing components depicted in FIG. 1 and FIG. 4 may be embodied, individually or in combination, in a computing device in the form of, for example, a personal computer, a server computer, a mobile computer, or any other suitable computing device. In various embodiments, the computing device may be used to implement computer programs, logic, applications, methods, processes, or software to provide data transformation operations, as described herein. Although mobile client scenarios are illustrated, it will be understood that the applicability of the presently described data transformation techniques and components are not limited to mobile client scenarios. A variety of clients and client types (including combinations of mobile and non-mobile client types) may be used.

With respect to the depicted system configurations depicted, it should be appreciated that in other embodiments, the systems and network configurations may include fewer or more components apart from those shown. For example, in example embodiments, the data services provided in the corporate intranet/backend can be integrated within fewer or additional components. The components and respective modules may be in the form of software that is processed by a processor. In another example, the components and respective modules may be in the form of firmware that is processed by application specific integrated circuits (ASIC), which may be integrated into a circuit board. The components and respective modules also may be in the form of one or more logic blocks included in a programmable logic device (for example, a field programmable gate array). The components and respective modules may be adapted, and/or additional structures may be provided, to provide alternative or additional functionalities beyond those specifically discussed.

It will be apparent to those skilled in the art that various modifications and variations can be made in the system and method for backend field control of the present disclosure without departing from the spirit or scope of the disclosure. Thus, it is intended that the present disclosure cover the modifications and variations of this disclosure provided they come within the scope of the appended claims and their equivalents.

I claim:

1. A computer-implemented method for exchanging data using a data transfer protocol between a first device and a second device, the method comprising:
receiving, at the first device, a request object from the second device;
receiving, at the first device from a third device, a response object in response to the request object;
transforming the response object by appending a one or more logical expressions for controlling at least one user-interface component of an application hosted at the second device, the controlling causing the at least one user-interface component to be hidden, read-only, editable, or mandatory;
varying the format of the response object to generate a transformed response object; and
sending the transformed response object to the second device;
wherein the first device intercepts data exchanged between the second device and the third device.

2. The method according to claim 1, wherein the data transfer protocol is an Open Data (OData) protocol standard.

3. The method according to claim 1, wherein the transformed response object includes expression bindings.

4. The method according to claim 1, wherein the transformed response object utilizes OpenUI5 expression bindings.

5. The method according to claim 1, wherein the logical expressions are executed at the second device.

6. A non-transitory computer readable storage medium storing one or more programs configured to be executed by a processor, the one or more programs for exchanging data using a data transfer protocol between a first device and a second device, and comprising instructions for:
receiving, at the first device, a request object from the second device;
receiving, at the first device from a third device, a response object in response to the request object;
transforming the response object by appending a one or more logical expressions for controlling at least one user-interface component of an application hosted at the second device, the controlling causing the at least one user-interface component to be hidden, read-only, editable, or mandatory;
varying the format of the response object to generate a transformed response object; and sending the transformed response object to the second device;

wherein the first device intercepts data exchanged between the second device and the third device.

7. The computer readable storage medium according to claim 6, wherein the data transfer protocol is an Open Data (OData) protocol standard.

8. The computer readable storage medium according to claim 6, wherein the transformed response object includes expression bindings.

9. The computer readable storage medium according to claim 6, wherein the transformed response object utilizes OpenUI5 expression bindings.

10. The computer readable storage medium according to claim 6, wherein the logical expressions are executed at the second device.

11. A communications device comprising:

one or more processors; and memory storing one or more programs for exchanging data using a data transfer protocol between the communication device and a second device, and comprising instructions for execution by the one or more processors, the one or more programs including instructions for:

receiving, at the first device, a request object from the second device;

receiving, at the first device from a third device, a response object in response to the request object;

transforming the response object by appending a one or more logical expressions for controlling at least one user-interface component of an application hosted at the second device, the controlling causing the at least one user-interface component to be hidden, read-only, editable, or mandatory;

varying the format of the response object to generate a transformed response object; and sending the transformed response object to the second device;

wherein the first device intercepts data exchanged between the second device and the third device.

12. The communications device according to claim 11, wherein the data transfer protocol is an Open Data (OData) protocol standard.

13. The communications device according to claim 11, wherein the transformed response object includes expression bindings.

14. The communications device according to claim 11, wherein the transformed response object utilizes OpenUI5 expression bindings.

15. The communications device according to claim 11, wherein the logical expressions are executed at the second device.

* * * * *